United States Patent [19]
Bober et al.

[11] Patent Number: 6,085,953
[45] Date of Patent: Jul. 11, 2000

[54] CONTAINER HOLDER FOR VEHICLES

[75] Inventors: Bruce Brian Bober, Farmington Hills; Glenn M. Henige, Lake Orion; Joseph Ferraiuolo, Jr., South Lyon, all of Mich.

[73] Assignee: Saturn Corporation, Troy, Mich.

[21] Appl. No.: 09/186,321

[22] Filed: Nov. 4, 1998

[51] Int. Cl.$^7$ ........................................................ B60R 7/06
[52] U.S. Cl. .......................... 224/282; 224/483; 224/553; 224/926
[58] Field of Search ..................................... 224/282, 483, 224/553, 926; 248/311.2; 297/188.14, 188.15, 188.16, 188.17, 188.19

[56] References Cited

U.S. PATENT DOCUMENTS 5,628,486   5/1997   Rossman et al. ........................ 224/926

*Primary Examiner*—Linda J. Sholl
*Attorney, Agent, or Firm*—Kathryn A. Marra

[57] ABSTRACT

A container holder for automotive use includes a mounting member wall having a recessed portion with an outwardly extending shelf. An outer member is pivotally mounted to the mounting member for pivotal movement between closed and open positions. The outer member carries container support means stored adjacent the recessed portion in the closed position and lying generally horizontal to support a container in the open position. The outer member includes a first pair of arcuate guide arms projecting from an upper portion of the outer member through laterally spaced slots formed in the wall adjacent laterally opposite sides of the recessed portion. An inner member includes a transverse guide portion connected at opposite lateral ends with a second pair of arcuate guide arms, extending through the slots and mounted for limited arcuate sliding motion of the inner member relative to the outer member. The inner member is pivotable with the outer member and the transverse guide portion is configured to fit between the recessed portion of the wall and the upper portion of the outer member when the outer member is in the closed position. Pivotal travel of the inner member is less than the pivotal travel of the outer member so that, in the outer position, the transverse guide portion is spaced inwardly of the outer member and is engagable with a container supported on the support means to control tipping of the container when mounted in the container holder. Additional features are disclosed.

18 Claims, 8 Drawing Sheets

6,085,953

CONTAINER HOLDER FOR VEHICLES

TECHNICAL FIELD

This invention relates to container holders or cup holders for vehicles and, in particular, to holders mounted in a wall of a vehicle and moveable between open positions for receiving containers and closed positions wherein the container holder is hidden within the wall.

BACKGROUND OF THE INVENTION

In current automobiles and other vehicles it is well known to provide container holders or cup holders for holding drink containing cans, bottles and cups in positions of easy access for use by the driver and/or passengers of the vehicle. Such container holders vary from simple recesses in a surface such as an arm rest or the back of a foldable seat to various assemblies which provide an open position in which the container holder is usable for its purpose and a closed position where the container holder is recessed within a wall, such as the end of a console or an instrument panel member.

SUMMARY OF THE INVENTION

The present invention provides a beverage container holder mountable on a wall of an automotive vehicle, such as the end of a console, an instrument panel or other available location, and providing closed and open positions for storage or use of the holder device. The container holder includes a mounting member wall having a recessed portion with an outwardly extending shelf. An outer member is pivotally mounted to the mounting member for pivotal movement between closed and open positions.

The outer member carries container support means stored adjacent the recessed portion in the closed position and lying generally horizontal to support a container in the open position. The outer member of the outer member through laterally spaced slots formed in the wall adjacent laterally opposite sides of the recessed portion.

An inner member includes a transverse guide portion connected at opposite lateral ends with a second pair of arcuate guide arms, extending through the slots and mounted for limited arcuate sliding motion of the inner member relative to the outer member. The inner member is pivotable with the outer member and the transverse guide portion is configured to fit between the recessed portion of the wall and the upper portion of the outer member when the outer member is in the closed position. Pivotal travel of the inner member is less than the pivotal travel of the outer member so that, in the outer position, the transverse guide portion is spaced inwardly of the outer member and is engagable with a container supported on the support means to control tipping of the container when mounted in the container holder.

The holder of the present invention is of relatively simple and inexpensive construction having components which may be molded of suitable plastic or other material as desired. In the stored position, the holder assembly is particularly compact, requiring a relatively small amount of space, for example, in one end of a vehicle console. In the open position, it provides an unusually deep receptacle for stabilizing containers by reason of the pivoting inner member.

These and other features and advantages of the invention will be more fully understood from the following description of certain specific embodiments of the invention taken together with the accompanying drawings.

DESCRIPTION OF THE PREFERRED EMBODIMENT

Figure 1:
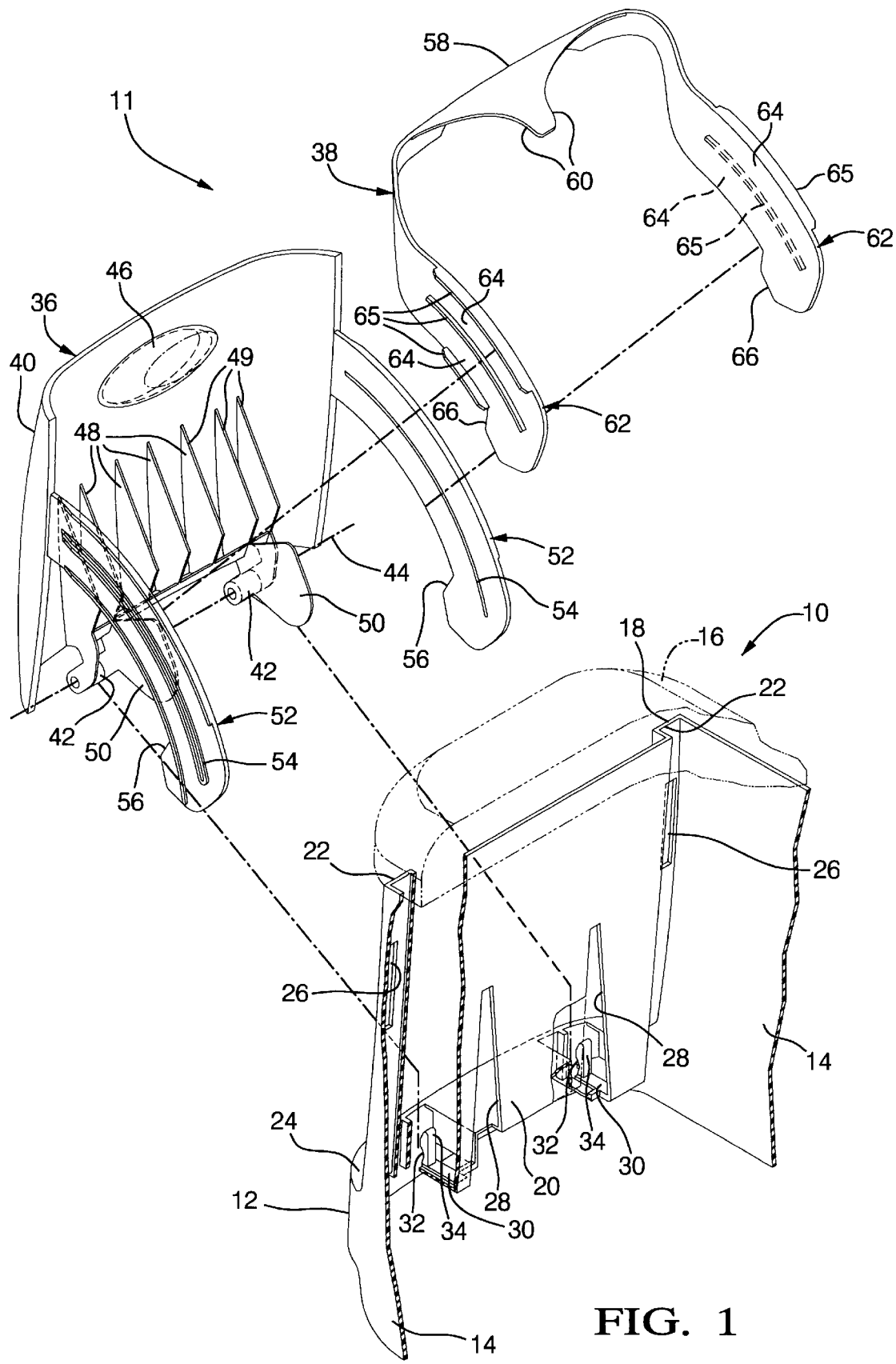
FIG. 1 is an exploded pictorial view of a container holder assembly with one end of a vehicle console having portions broken away for viewing the interior structure.

Referring now to FIGS. 1–5 of the drawings in detail, numeral 10 generally indicates the rear portion of a console located between the front seats of an automobile or other vehicle and incorporating a beverage container holder 11. The console 10 includes a rear wall 12, side walls 14 and a top wall 16, shown in phantom lines. The console includes a mounting member on the rear wall 12 of which is provided a recessed portion 18. Portion 18, in the present instance, is formed by cutting off a portion of the rear wall 12 as it curves around the back of the console and is merged by curved portions into the side walls 14. The cut off portion is provided with a rear partition 20 which is slightly recessed and connects with stepped outer portions 22 extending downward to a shelf 24 forming the bottom of the recessed portion 18. In an upper part of the outer portions adjacent the side walls 14, vertically extending slots 26 are provided opening through the outer portions for a purpose to be subsequently described. Openings 28 are also provided in a lower part of the recessed portion 18.

On laterally opposite sides of the shelf, depressed portions 30 are provided with bearing portions 32 formed with open tops and resilient fingers 34. The top wall 16 of the console extends rearward of the recessed portion having a curvature generally similar to and aligned with that of the rear wall 12. The console body may be conveniently molded of plastic material or made of any other material suitable for the purpose.

The above described features of the console form a part of the container holder or cup holder 11 according to the invention which is mounted to the rear wall 12 of the console. The holder 11 also includes an outer member 36 and an inner member 38.

The outer member 36 includes an outer wall 40 having, at a lower end, downwardly projecting arms connected with laterally extending journals 42 which are laterally spaced and snap into the bearing portions 32 for allowing pivotal motion of the outer member about a generally horizontal axis 44 extending transversely of the console. The outer wall 40 may be provided with a molded in finger pull 46 for pivoting the outer member between open and closed positions. Container support ribs 48 extending longitudinally and vertically on the inner side of outer wall 40 are configured so that in the open position of the outer wall, upper edges 49 of the ribs 48 lie in a generally horizontal plane and thereby provide support means to support one or two containers in side by side relation on the outer member. In the closed position of the outer member, the support ribs 48 are stored between the outer wall 40 and the partition 20 of the recessed portion. Optional restraint tabs 50 are formed on arms which support the journals 42 and extend upward in the open position of FIG. 5 to restrain lower portions of containers placed on the support surface from moving forward into the recessed portion 18. The tabs 50 pivot forward into openings 28 when the outer member is moved to the closed position.

Outer member 36 includes a first pair of arcuate arms 52 projecting from laterally spaced upper portions of the outer member adjacent opposite edges of the outer wall 40 and extending into the slots 26 formed in the outer portions 22 of the partition 20 in the recessed portion of the rear wall 12. Each of the arms 52 is formed with a curved slot 54 extending intermediate its ends and includes a depending stop 56 on its end distal from the outer wall 40.

The inner member 38 includes a transverse guide portion 58 preferably curved to provide partial cutouts 60 forming a transverse guide portion adapted to constrain the outer sides of containers placed in the holder against tipping in a sideward or rearward direction. A second pair of arcuate guide arms 62 extend forward, one from either lateral end of the transverse guide portion 58. Arms 62 are provided with grooves 64 on their outer sides, formed by raised ribs 65 and receiving in assembly the guide arms 52 of the outer member 36. The inner member is thus supported through its guide arms 62 on the guide arms 52 of the outer member with the lengths of the grooves and slots being such as to permit relative sliding motion of the inner member with respect to the outer member or vice versa. Guide arms 62 are also provided with depending stops 66 at their ends distal from the transverse guide portion 58.

Both the outer and inner members 36, 38 are designed to be molded from suitable plastic or other material as desired.

Figure 2:
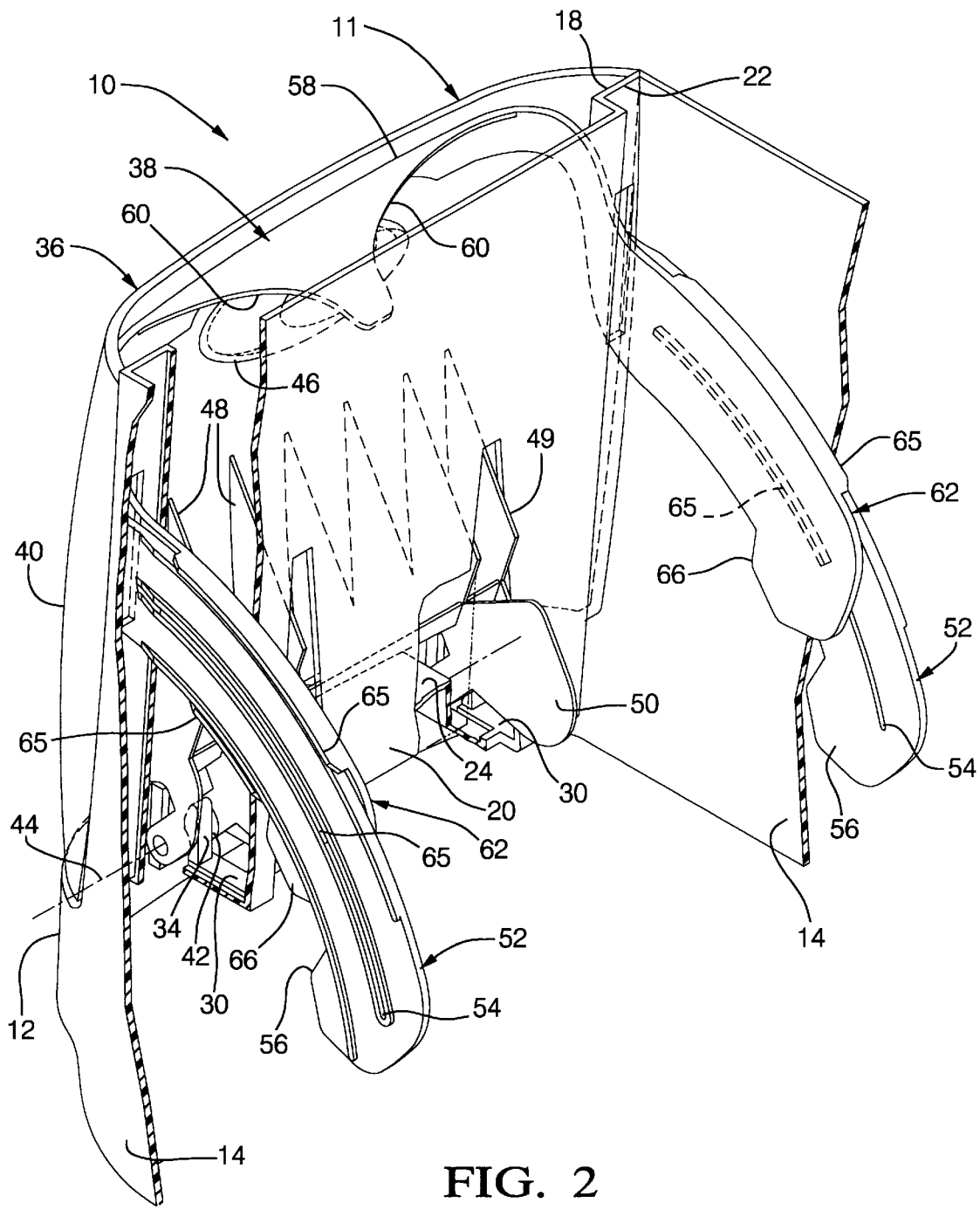
FIG. 2 is a pictorial view of the assembled components of FIG. 1 shown in a closed position of the holder.
Figure 3:
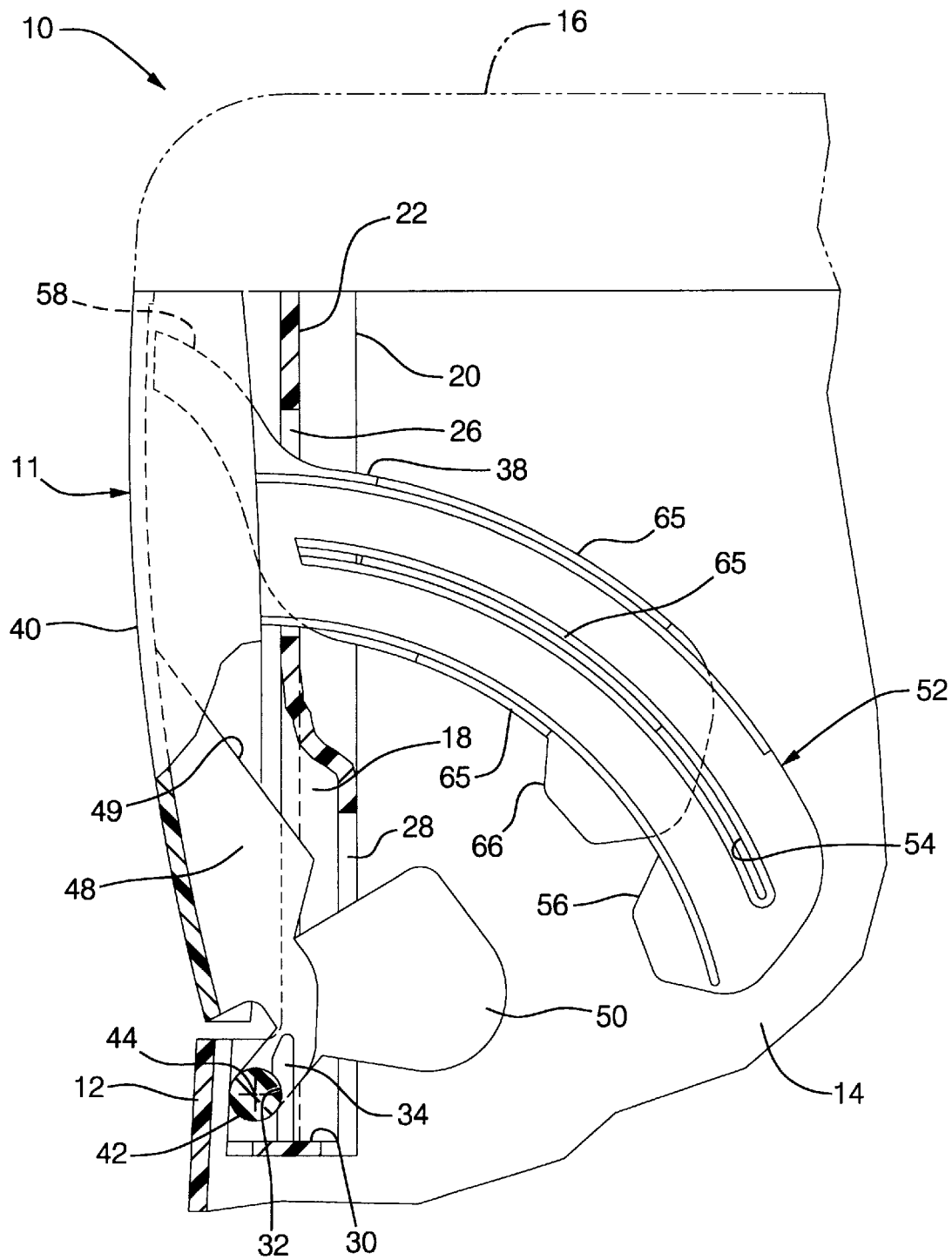
FIG. 3 is a side view of the assembly of FIG. 2 shown in the closed position with portions broken away to show internal portions.
Figure 4:
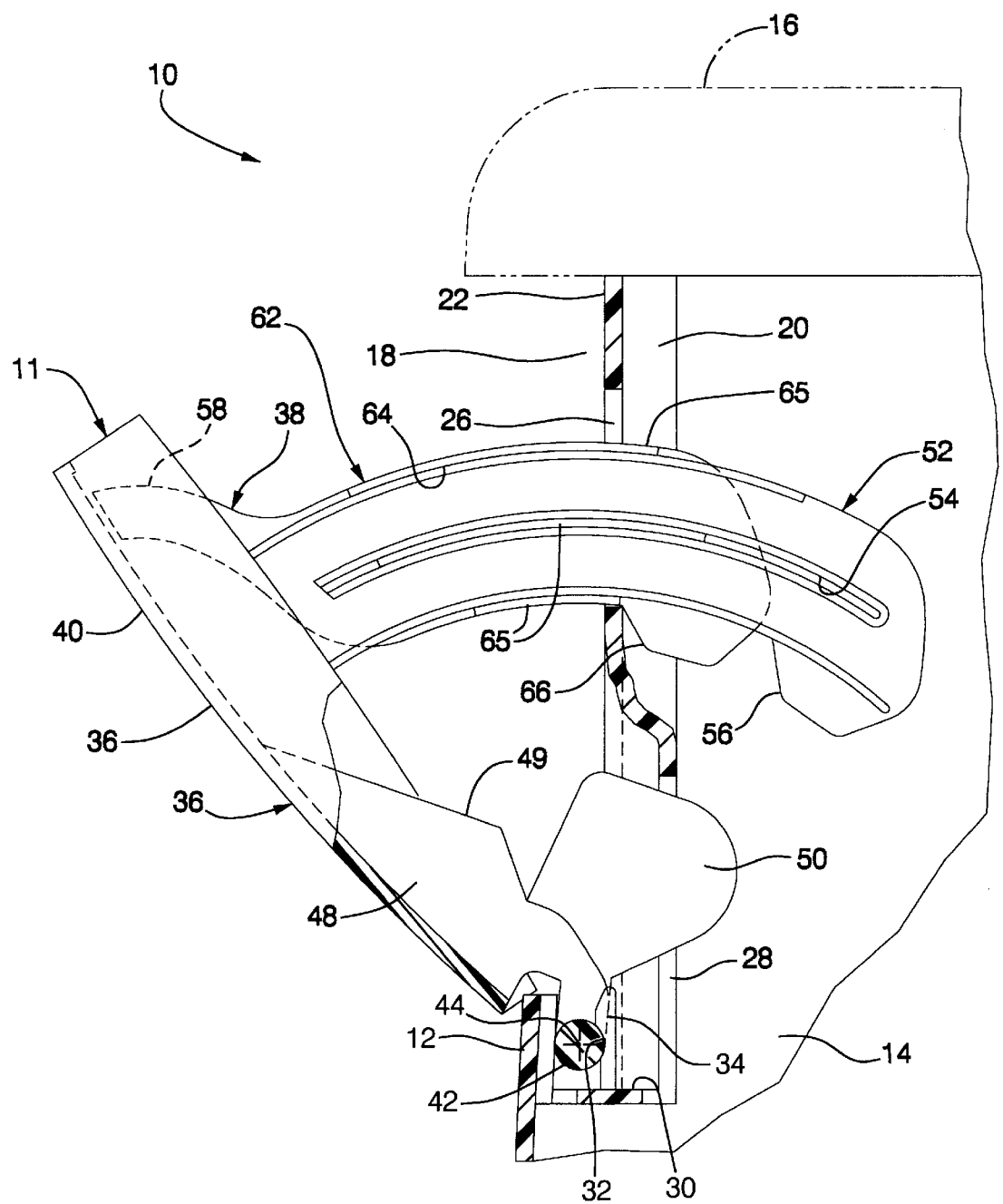
FIG. 4 is a view similar to FIG. 3 but with the holder in a partially open position.
Figure 5:
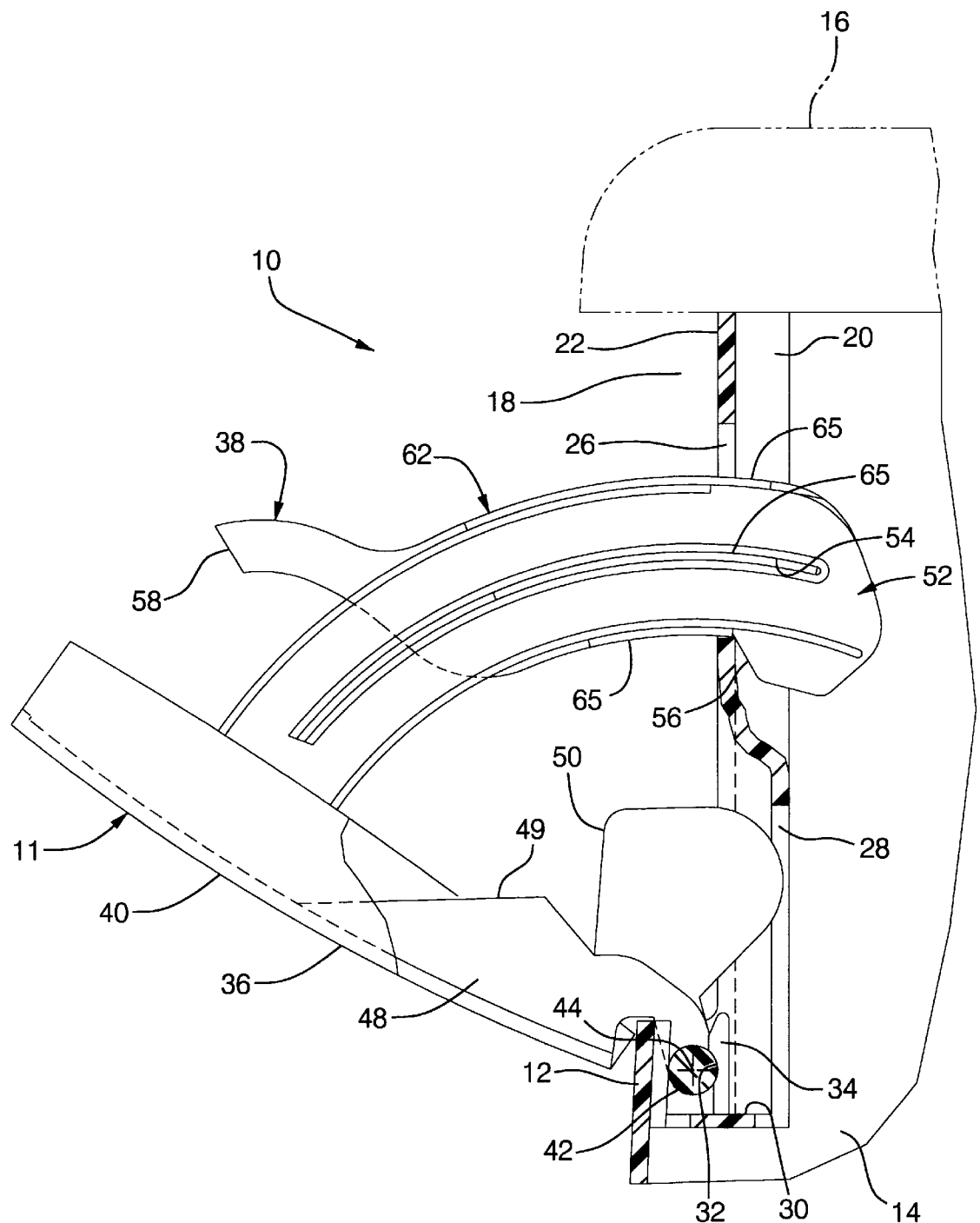
FIG. 5 is a view similar to FIGS. 3 and 4 but with the holder in a fully open position.

In operation, when the container holder 11 is located in its closed position, shown in FIGS. 2 and 3, the outer wall 40 of the outer member 36 is positioned generally flush with the rear wall 12 of console 10 along with the side walls 14 and top wall 16. The transverse guide portion 58 of the inner member is stored between the outer wall 40 of the outer member and the partition 20 of the recessed portion 18, the inner member being pivoted or slid rearward to its retracted position with the guide portion 58 adjacent the outer wall 40.

To open the container holder 11, the outer member 36 is pivoted backward around the horizontal axis 44 by grasping the finger pull 46 and pulling it outward and downward from the rear wall 12 of the console. The open position (FIG. 5) of the rear wall is located by engagement of the depending stops 56 of the guide arms 52 with the outer portions 22 at the bottom of slots 26 so that the outer wall is fixed at an angle of between about 40° and 60° from the vertical closed position. In this open position, the coplanar tops 49 of the support ribs 48 form support means for containers which may be placed in the container holder.

The opening of the outer member also carries rearwardly the inner member 38 which moves with the outer member until its depending stops 66 on guide arms 62 engage the outer portions 22 at the bottom of slots 26. At this point, the transverse guide portion 58 is positioned at a desired location for holding containers stored in the holder 11 in upright positions as desired. Further outward movement of the outer member to its desired position, allows sliding of the guide arms 52 relative to guide arms 62 of the inner member so that the transverse guide portion 58 remains fixed while the outer wall 40 is pivoted away from it. Thus, the guide portion 58 is no longer recessed within the outer wall 40 when the container holder is in the open position. In this position, the top wall 16 of the console 10 cooperates with the transverse guide portion 58 of the inner member and the optional restraint tabs 50 of the outer member as well as the guide arms 62 of the inner member to maintain containers placed within the holder 11 in upright positions as desired.

When the container holder 11 is in its open position, it is possible that excessive downward force may be applied against the open outer member 36, such as by accidental hitting of the member with the foot of an occupant, or in any other way. In this instance, the outer and inner members of the container holder may be detached from the console rear wall 12 without damage by the application of such an excessive force. The depending stops 56, 66 of the outer and inner members are angled so that upon the application of excessive force they will ride up on the bottom of slots 26 and allow the arms to slide out of the slots 26 and be free of the console. At the same time, journals 42 of the outer member will be released by the resilient fingers 34 of the bearing portions 32 so that they will separate from the rear wall of the console without damage to the bearing portions 32, including fingers 34. Thus, the separated components may be quickly reassembled after the accidental separation without requiring replacement of any damaged parts.

Figure 6:
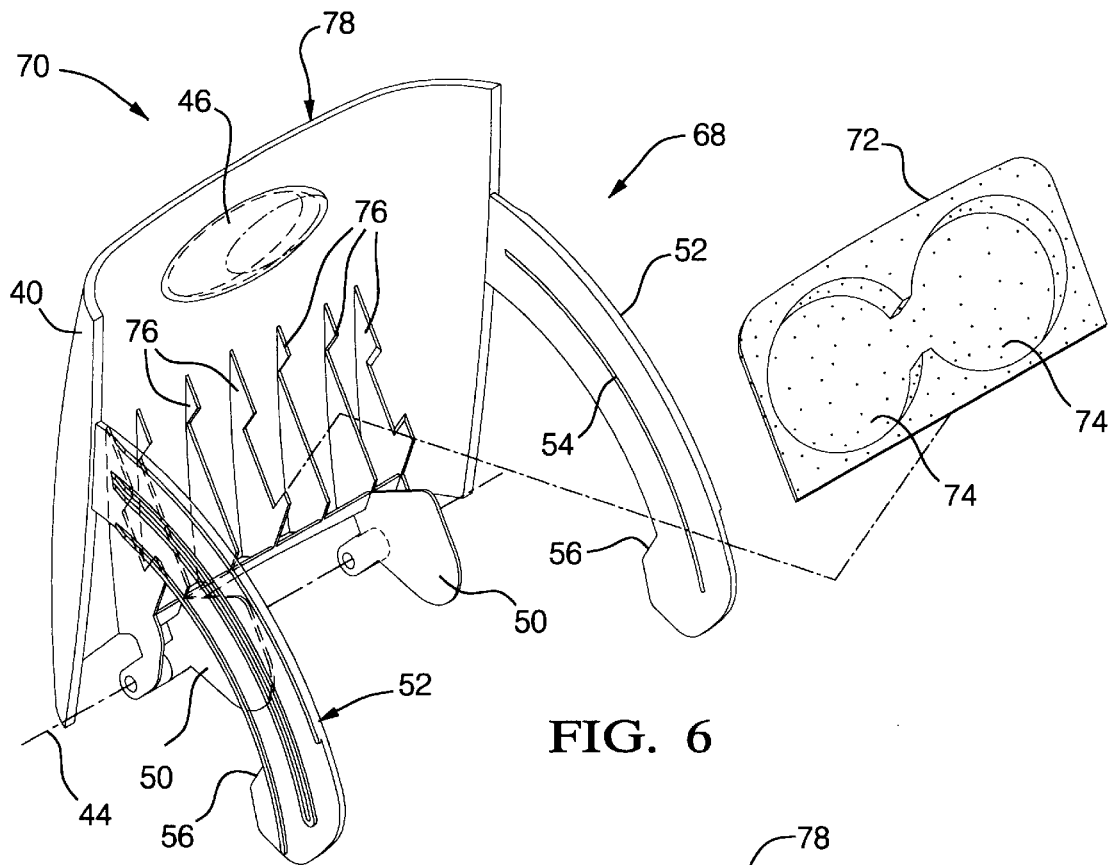
FIG. 6 is an exploded pictorial view of an outer wall assembly for an alternative embodiment.
Figure 7:
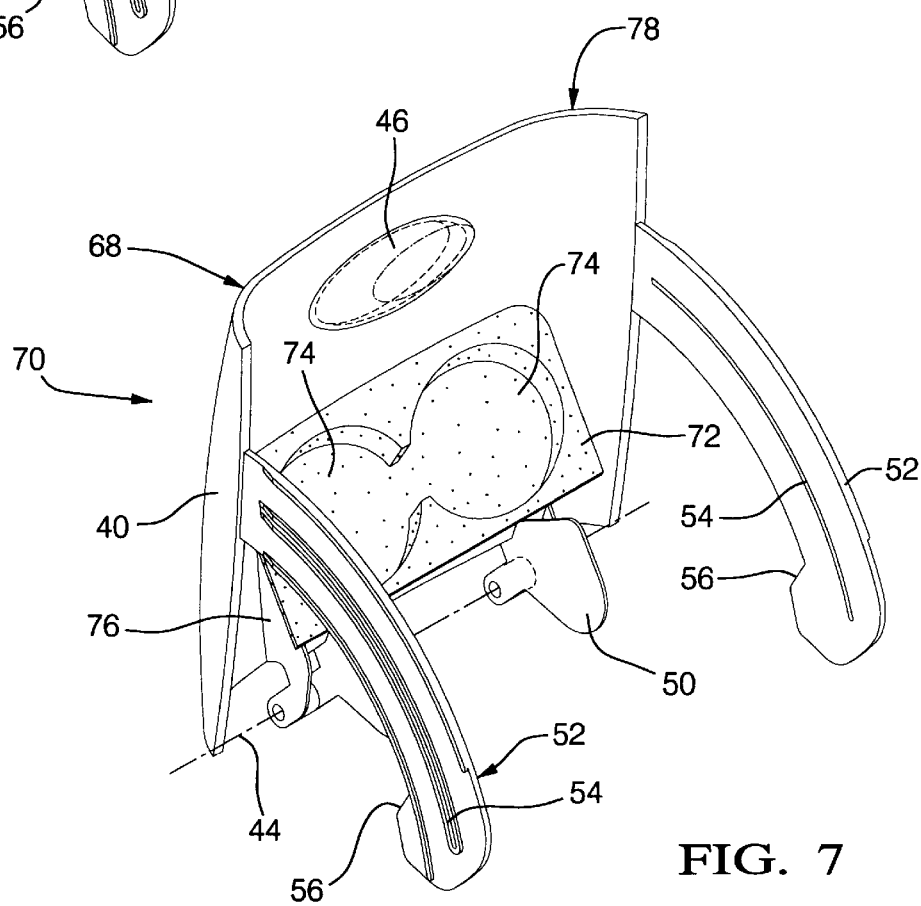
FIG. 7 is a pictorial view of the assembled components of FIG. 6.

FIGS. 6 and 7 show an alternative embodiment of an outer member assembly 68 for a container holder 70 in which like numerals indicate like parts. Assembly 68 includes an additional support component 72 having cup like recesses 74. Component 72 may be mounted on the stiffening ribs 76 of an outer member 78, the ribs being modified to carry the support component 72 in a position that a lows it to be stored between the outer wall 40 of the outer member 78 and the partition 20 of the console recessed portion 18 (see FIGS. 1 and 3–5) when the modified container holder 70 is in the closed position.

Figure 8:
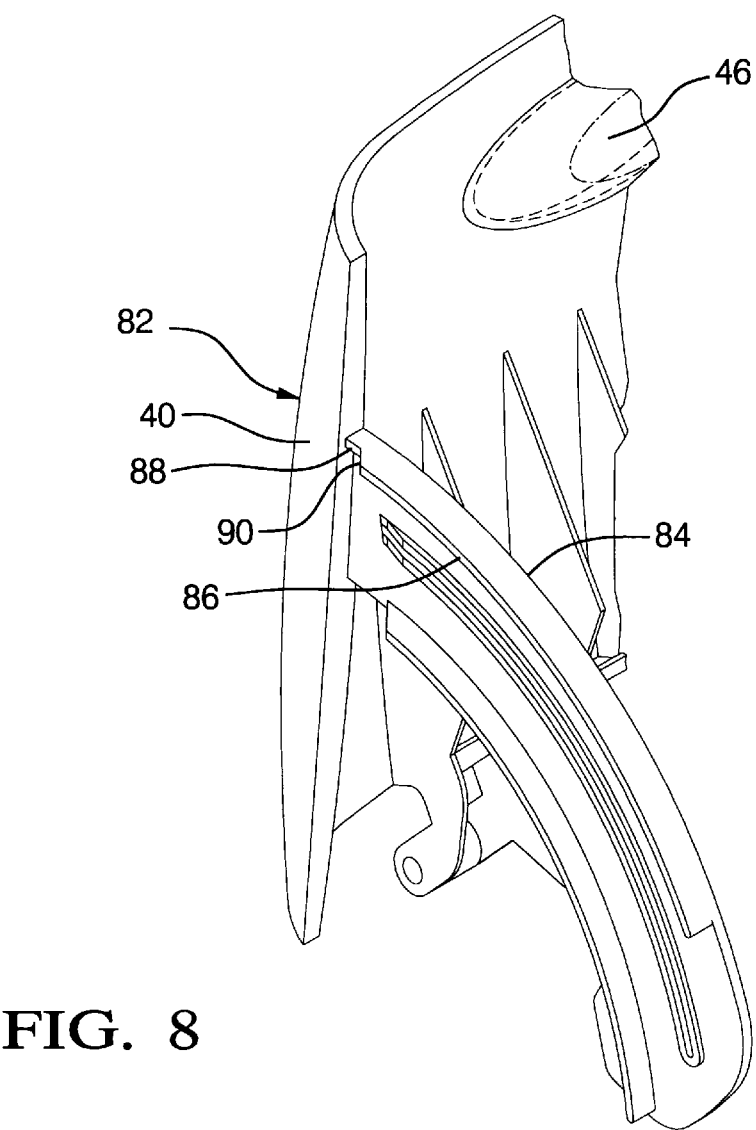
FIG. 8 is a fragmentary pictorial view of a modified outer member including retainer means.
Figure 9:
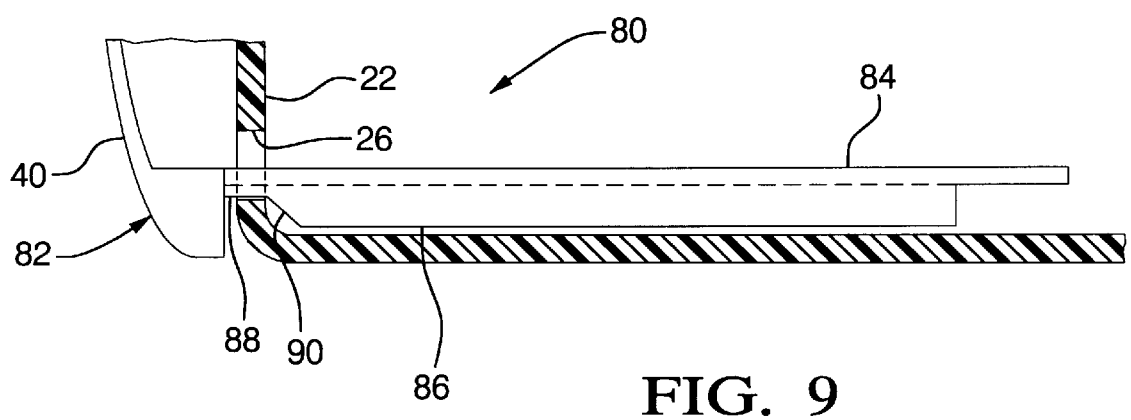
FIG. 9 is a fragmentary horizontal cross-sectional view through a portion of a console assembly including the retainer means of FIG. 8.

FIGS. 8 and 9 show a console assembly 80 having a modified outer member 82 with a detent or latch to normally retain the container holder closed. In this embodiment, the outer member 82 has at least one guide arm 84 with a wider upper rib 86 including a notch 88 next to the outer wall 40. The notch 88 coacts with the edge of the associated slot 26 in an outer portion 22 of the partition 20 of the console rear wall 12 to normally maintain the outer member 82 in th closed position shown in FIG. 9. Upon opening the holder, an angled edge 90 of the notch 88 flexes the guide arm 84 slightly inward to permit the opening motion.

Figure 10:
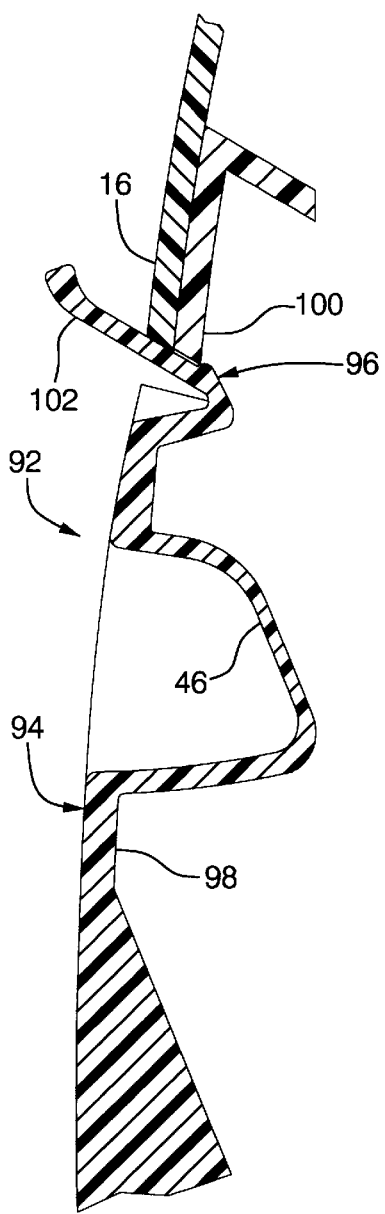
FIG. 10 is a fragmentary vertical cross-sectional view of a varied embodiment of container holder in which a resilient latch is molded to the outer member for engaging the cover.
Figure 11:
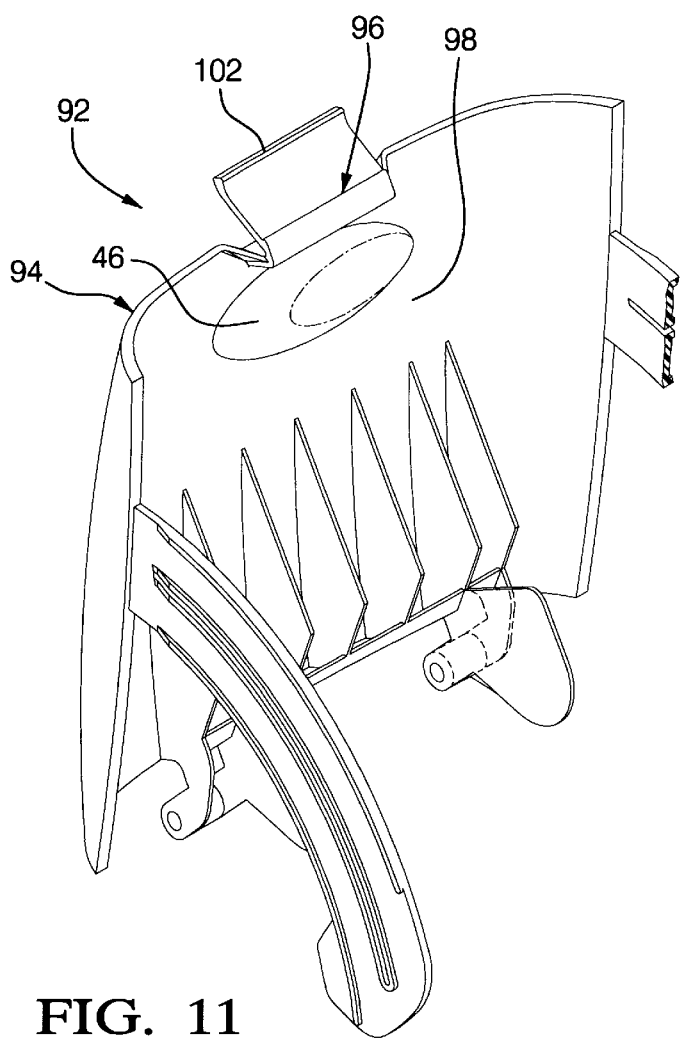
FIG. 11 is a pictorial view of the outer member for the embodiment of FIG. 10.

FIGS. 10 and 11 show another embodiment of container holder 92 in which an outer member 94 is modified from outer members 36, 78 of the previously described embodiments by the addition of a resilient latch 96. The latch 96 is integrally molded to the upper edge of a modified outer wall 98, just above the finger pull 46. The latch 96 engages a depending edge 100 of cover 16 to hold the container holder 92 in the closed position. To open the holder 92, a tab 102 of the latch 96 is grasped and pivoted downward while pulling outward, causing the latch to disengage from the cover 16 and allowing outward pivoting of the outer wall 98 and the associated assembly.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A container holder for use in vehicles, said holder comprising:

a mounting member having a wall, said wall having a recessed portion terminating downwardly at an outwardly extending shelf;

an outer member mounted to said mounting member for pivotal movement between a closed position enclosing the recessed portion above the shelf and an open position pivoted outward from the recessed portion about a generally horizontal axis adjacent a lower edge of the outer member, said outer member carrying container support means stored adjacent the recessed portion of the wall in the closed position and lying generally horizontal in the open position to support a container placed between the outer member and the recessed portion, said outer member including a first pair of arcuate guide arms projecting from an upper portion of the outer member through laterally spaced slots formed in the wall of the mounting member adjacent laterally opposite sides of the recessed portion, an inner member including a transverse guide portion connected at opposite lateral ends with a second pair of arcuate guide arms, extending through said slots and mounted relative to said first pair of guide arms for limited arcuate sliding motion of the inner member relative to the outer member; said inner member being movable with said outer member and the transverse guide portion being configured to fit between the recessed portion of the wall and the upper portion of the outer member when the outer member is in the closed position; and limiting means for limiting pivotal travel of the inner and outer members, the inner member being limited to less than the pivotal travel of the outer member so that, in the outer position of the outer member, the transverse guide portion of the inner member is spaced inwardly of the outer member and is engagable with a container which may be supported on the support means of the outer member to control tipping of the container when mounted in the container holder.

2. A container holder as in claim 1 wherein said mounting member is a console and said wall is an end wall of the console.

3. A container holder as in claim 2 wherein said end wall is a rear end wall of the console.

4. A container holder as in claim 1 wherein said outer member is configured to lie, in said closed position, generally flush with an unrecessed portion of said wall.

5. A container holder as in claim 1 and including pivot means connecting said outer member with said mounting member on said axis below said horizontal shelf.

6. A container holder as in claim 5 wherein said pivot means include resilient bearing fingers on said wall releasably retaining journals on said outer member such that excessive downward force on the outer member when open disconnects the journals from the fingers without damaging either and allowing subsequent reassembly of the components without requiring repair.

7. A container holder as in claim 1 wherein said container support means includes coplanar edges of stiffening ribs extending inwardly from an outer wall of the outer member.

8. A container holder as in claim 7 and including a separate cup element fixed to the ribs and providing lateral restraint for a supported container.

9. A container holder as in claim 1 wherein said second pair of arcuate guide arms are supported on said first pair for said limited arcuate sliding motion.

10. A container holder as in claim 9 wherein one of said first and second pairs of guide arms include portions received in grooves of the other pair of guide arms for slidingly supporting one of said pairs on the other.

11. A container holder as in claim 1 wherein said limiting means include depending stops on said arcuate guide arms for engaging edges of said slots to normally permit less pivotal travel of the inner member than the outer member.

12. A container holder as in claim 11 wherein said stops are angled to disengage from said slots upon the application of predetermined pivoting force to prevent accidental damage to the outer and inner members.

13. A container holder as in claim 2 wherein said console includes an upper wall extending over said outer member in the closed position, said upper wall acting as a guide to further restrain tipping motion of a container supported in the holder.

14. A container holder as in claim 1 and sized to hold a pair of containers in side by side relation, said transverse guide portion of the inner member being shaped to surround outer portions of the containers to control tipping of one or two containers when supported in the holder.

15. A container holder as in claim 1 wherein said outer and inner members are molded parts.

16. A container holder as in claim 15 wherein said outer member is formed with an integrally molded latch.

17. A container holder as in claim 16 wherein said latch includes a notch formed in a rib of one of said guide arms of said outer member and engaging an edge of one of said laterally spaced slots through which said guide arm extends to maintain said outer member in the closed position, one of said guide arm and said notch flexing to allow opening of said outer member.

18. A container holder as in claim 16 wherein said mounting member is a console having an upper wall and said latch engages said upper wall in said closed position of the holder.

* * * * *